United States Patent
Park et al.

(10) Patent No.: US 10,843,108 B2
(45) Date of Patent: Nov. 24, 2020

(54) WATER TREATMENT SYSTEM

(75) Inventors: Stuart L. Park, Chardon, OH (US); Jerome P. Kovach, Chagrin Falls, OH (US); Mark J. Brotman, Burton, OH (US); Jimmie L. Hunt, Girard, OH (US)

(73) Assignee: KINETICO INCORPORATED, Newbury, OH (US)

(*) Notice: Subject to any disclaimer, the term of this patent is extended or adjusted under 35 U.S.C. 154(b) by 1073 days.

(21) Appl. No.: 14/126,562

(22) PCT Filed: Jun. 21, 2012

(86) PCT No.: PCT/US2012/043511
§ 371 (c)(1),
(2), (4) Date: Dec. 16, 2013

(87) PCT Pub. No.: WO2012/177850
PCT Pub. Date: Dec. 27, 2012

(65) Prior Publication Data
US 2014/0116928 A1    May 1, 2014

Related U.S. Application Data

(60) Provisional application No. 61/499,302, filed on Jun. 21, 2011.

(51) Int. Cl.
*B01D 35/147* (2006.01)
*C02F 1/00* (2006.01)

(52) U.S. Cl.
CPC ........... *B01D 35/147* (2013.01); *C02F 1/006* (2013.01); *C02F 1/008* (2013.01);
(Continued)

(58) Field of Classification Search
None
See application file for complete search history.

(56) References Cited

U.S. PATENT DOCUMENTS

| 844,438 A | * | 2/1907 | Bayley | B01D 35/12 |
| | | | | 137/625.47 |
| 4,615,800 A | * | 10/1986 | Stifelman | B01D 35/14 |
| | | | | 210/132 |

(Continued)

FOREIGN PATENT DOCUMENTS

| CN | 1089185 | 7/1994 |
| CN | 1089185 A | 7/1994 |

(Continued)

OTHER PUBLICATIONS

Chinese Search Report Appln. 201280030532.9 completed Dec. 8, 2014 which relates to PCT/US2012/043511.

(Continued)

*Primary Examiner* — Jason M Greene
*Assistant Examiner* — Eric J McCullough
(74) *Attorney, Agent, or Firm* — Tarolli, Sundheim, Covell & Tummino LLP (57) ABSTRACT

A water treatment system having an inlet for receiving water to be treated and a manifold that defines a pair of fluid streams communicating with the inlet. A valve module carried by the manifold controls the communication of water at the inlet with treatment cartridges and with a common outlet. The valve module includes a valve member that is movable between two positions such that, in one position, the valve member communicates each fluid stream with an associated cartridge and, in a second position, communicates the inlet with the common outlet and bypasses the cartridges. A remotely mounted cartridge depletion indicator is provided that includes a linkage that is magnetically coupled to a stem assembly located within a flow metering mechanism. Movement in the internal stem assembly is transferred via the magnetically coupled external linkage to a cartridge depletion indicator visible to the operator.

14 Claims, 12 Drawing Sheets

(52) U.S. Cl.
CPC .. *C02F 2201/004* (2013.01); *C02F 2201/005* (2013.01); *C02F 2201/006* (2013.01); *C02F 2209/40* (2013.01); *C02F 2209/445* (2013.01); *C02F 2303/14* (2013.01)

(56) References Cited

U.S. PATENT DOCUMENTS

| | | | |
|---|---|---|---|
| 4,698,164 | A | 10/1987 | Ellis |
| 5,527,451 | A | 6/1996 | Hembree et al. |
| 5,707,527 | A * | 1/1998 | Knutson ............... B01D 29/15 210/170.03 |
| 5,741,416 | A | 4/1998 | Tempest, Jr. |
| RE37,216 | E | 6/2001 | Koslow |
| 6,347,644 | B1 | 2/2002 | Channell |
| 6,428,708 | B1 * | 8/2002 | Halemba ............. B01D 29/603 210/100 |
| 6,966,986 | B1 | 11/2005 | Lackey |
| 6,996,986 | B2 | 2/2006 | Arnold |
| 2003/0041908 | A1 | 3/2003 | Scanlan et al. |
| 2004/0027430 | A1 * | 2/2004 | Anderson ........... B41J 2/17513 347/86 |
| 2005/0092673 | A1 * | 5/2005 | Fritze ................. B01D 35/147 210/235 |
| 2006/0060512 | A1 | 3/2006 | Astle et al. |
| 2007/0045160 | A1 * | 3/2007 | Prescott ................. C02F 1/008 210/87 |
| 2007/0278318 | A1 | 12/2007 | Kempf et al. |
| 2007/0295667 | A1 * | 12/2007 | Ruprecht .............. B01D 27/02 210/693 |
| 2008/0216877 | A1 * | 9/2008 | Lawson ............... E04H 4/0025 134/111 |
| 2009/0107906 | A1 | 4/2009 | Ennis et al. |
| 2010/0018912 | A1 | 1/2010 | Wawrla et al. |
| 2010/0101990 | A1 | 4/2010 | Haehn et al. |

FOREIGN PATENT DOCUMENTS

| | | | |
|---|---|---|---|
| CN | 1541312 | 10/2004 | |
| CN | 101553295 | 4/2013 | |
| WO | WO-2010027989 A2 * | 3/2010 | ............ B01D 35/30 |
| WO | 2011030340 | 3/2011 | |

OTHER PUBLICATIONS

Translation of CN Patent Office Search Report CPME1346147P—dated Oct. 14, 2015.
European Search Report EP 12 80 2617; completed Feb. 20, 2015 with Written Opinion.
PCT/US12/43511 International Search Report & Written Opinion completed Aug. 23, 2012.

* cited by examiner

WATER TREATMENT SYSTEM

CROSS REFERENCES TO RELATED APPLICATIONS

This application filed under 35 U.S.C. § 371 is a national phase application of International Application Serial Number PCT/US2012/043511 filed Jun. 21, 2012, which claims priority to U.S. Provisional Application 61/499,302, filed Jun. 21, 2011.

RELATED APPLICATIONS

This application claims priority to U.S. Provisional Application No. 61/499,302, filed Jun. 21, 2011, the entirety of which is incorporated herein by reference.

TECHNICAL FIELD

The present invention relates generally to a fluid treatment system and in particular to an improved system providing treatment to a supply line prior to an existing faucet.

BACKGROUND OF THE INVENTION

The device allows for the full flow of treated water to an existing faucet, thus eliminating the need of changing out plumbing or adding a separate faucet for treated water. By using an existing tap and pressurized water source, treated water is available at the moment a consumer wants to fill their cup. Unlike pitchers, there is no waiting for the water to be treated. It is treated on demand. Unlike existing under the sink treatment systems, the water treatment system is designed to achieve the required flow rates of a standard faucet, thus eliminating the need for a separate faucet and difficult installation. To achieve these flows, the water treatment system is designed to use two cartridges operating in parallel. To simplify cartridge change-outs, the water treatment system includes horizontal mounting of the cartridges. To operate the cartridges in a horizontal orientation, the water treatment system includes a water management system to mitigate the loss of water during cartridge replacement. The design of the water treatment system is a cabinet configuration, allowing for easy installation within the typical minimal space available under a sink.

SUMMARY OF THE INVENTION

The water treatment system provides an alternative to under sink filters which are difficult to install but provide on-demand access to treated water, a pitcher which requires no installation but has an inconvenient operation and a tap mounted system which may be easy to install and provides on-demand water, but may also be a distraction to the décor of a kitchen faucet.

To create an alternative choice, the water treatment system provides easy installation, immediate treatment of the water and does not visually impact the existing look of the kitchen.

The present invention provides a new and improved water treatment system for treating water that is ultimately dispensed by a faucet. In the preferred and illustrated embodiment, water to be treated is received by a treatment system inlet. The water received at the inlet is split into two streams, each stream being treated by an associated cartridge. After leaving the associated cartridges, the streams are rejoined and communicated to a common outlet, which may be connected to the faucet.

In the preferred and illustrated embodiment, the system includes structure, which may define a manifold to which the treatment cartridges are removably attached and bypass valving for fluidly connecting the cartridges to their associated fluid streams. The bypass valving preferably includes a rotatable valve module (including an operating handle) that is rotatable between two positions. In one position (service position), the individual fluid streams are fluidly connected with their associated cartridges. Individual cartridge outlets, which receive treated/filtered water from the cartridges, are fluidly connected to a common outlet. In a second position (bypass position), passages in the module directly connect the inlet to the common outlet and the inlet water bypasses the fluid cartridges.

When the valve module is in the second position, the cartridges can be removed and replaced.

According to a feature of the invention, a camming arrangement is used to interlock the movement in the bypass valve module to the presence or absence of cartridges. In particular, camming elements forming part of the cartridge mounting apparatus are moved into and out of engagement with the bypass valve module, depending on the presence or absence of cartridges. In order to remove a cartridge, the bypass valve module must be in the bypass position at which inlet water is communicated directly to the outlet and bypasses the individual cartridge fluid paths. When an actual cartridge is removed, a camming element associated with the cartridge is moved into a locking position with the bypass module and inhibits the bypass module from being rotated to the service position. When the cartridges are reinstalled, the cartridge camming elements release the bypass module and allow the module to rotate to the service position.

According to a feature of the invention, a remotely located, operator-visible cartridge life or depletion status indicator is provided. According to this feature, the manifold includes a flow metering arrangement similar in function to the flow metering system disclosed in U.S. Pat. No. 6,428,708. Since the disclosed water treatment system is intended to be used in confined spaces, such as under a sink, the cartridge life indicator disclosed in the above-identified patent may not be visible to the user. Accordingly, a remote indicator is provided that is visible to the operator, even if the unit is mounted under sink. To achieve this feature, the manifold is equipped with a flow metering arrangement similar to that disclosed in the above '708 patent. As disclosed in the above-identified patent, a flow metering apparatus is provided that includes a water driven turbine connected to a cartridge life indicating stem assembly, via a gear train, such that rotation of the turbine by water passing through the cartridge produces movement in the stem assembly. According to the invention, a magnet is mounted to the stem assembly and is positioned in alignment with a driven magnet assembly located outside a chamber in which the cartridge stem assembly is axially movable. In the preferred and illustrated embodiment, a ring-shaped element mounts the driven magnet and is slidably received by the chamber in which the stem assembly is located. The magnetic coupling between the stem carried magnet and the driven magnet causes movement in the stem assembly to produce concurrent movement in the driven magnet. The driven magnet is connected via linkage to a crank mechanism that is pivotally mounted to the manifold. The crank assembly is connected to an indicator that is reciprocally mounted on a rail and located below a display having a plurality of windows. The indicator is arranged to change the color of or block the windows as it moves. As the cartridge is depleted, the colors of the windows change and, when all are covered, a depleted cartridge is indicated.

With the disclosed invention, a highly efficient water treatment system is provided. By dividing the flow into two branches, a large volume of water can be treated and, thus, the volume of water available at the faucet is not reduced by the treatment system.

The disclosed system may receive and utilize various types of cartridges. The cartridges could include treatment technology/processes such as activated carbon block, ultrafiltration, absorbents, ion exchange and various combinations of these technologies that are known by those skilled in the art of water treatment. In the preferred embodiment, both cartridges are substantially similar, if not identical, and utilize the same treatment technology. However, the invention does contemplate the mounting and using of cartridges of different configurations and/or technologies.

For example, cartridges can be used in the disclosed water treatment system that operate to remove chlorine, chloramine, heavy metals, such as lead and/or chromium, methyl tertiary butyl ether, volatile organics chemicals, etc. Cartridges can also be used to add beneficial elements or compounds, such as magnesium or calcium or desirable flavors or healthy nutritionals, to the water stream.

With the present invention, tap water dispensed at a faucet can be treated continuously and without a restriction to flow. As compared to a pitcher-type treatment device, a substantially large volume of water can be treated continuously as the water is delivered by faucet. The replaceable cartridges, as indicated above, can filter and/or treat water using various available technologies identified above and further including technologies for removing microbial contaminants from water which is difficult to accomplish with many prior art treatment devices. In addition, the water treatment system of the present invention is intended to be mounted "under sink" and, in the preferred embodiment, is oriented so the axes of the cartridges are substantially horizontal, thereby facilitating removable and replacement of the cartridges without the need for special tools, etc.

Additional features of the invention will become apparent and a fuller understanding obtained by reading the following detailed description made in connection with the accompanying drawings.

BRIEF DESCRIPTION OF THE DRAWINGS

The foregoing and other features and advantages of the present invention will become apparent to those skilled in the art to which the present invention relates upon reading the following description with reference to the accompanying drawings, in which.

DETAILED DESCRIPTION

Figure 1:
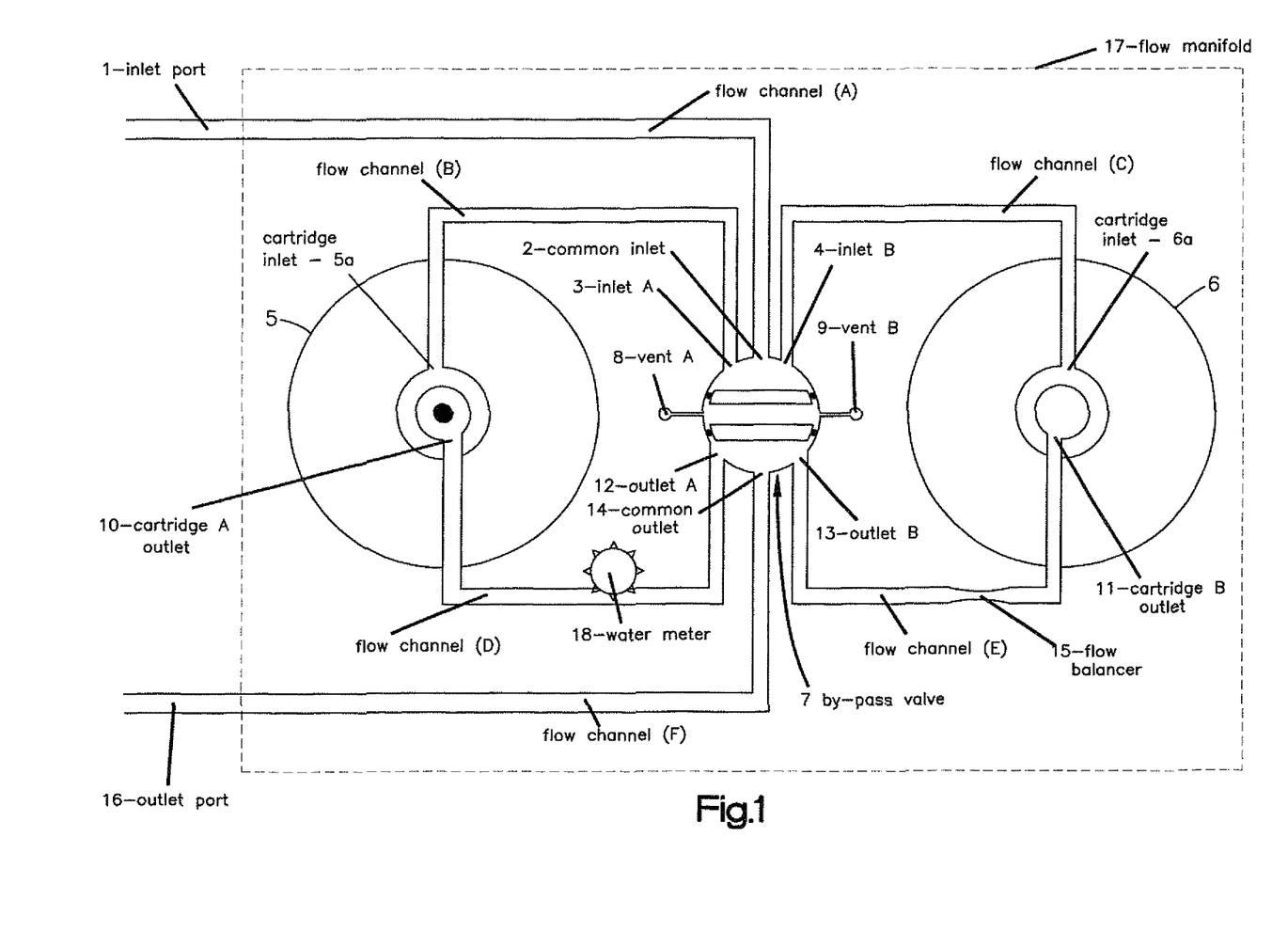
FIG. 1 is a schematic representation of the water treatment system.
Figure 4:
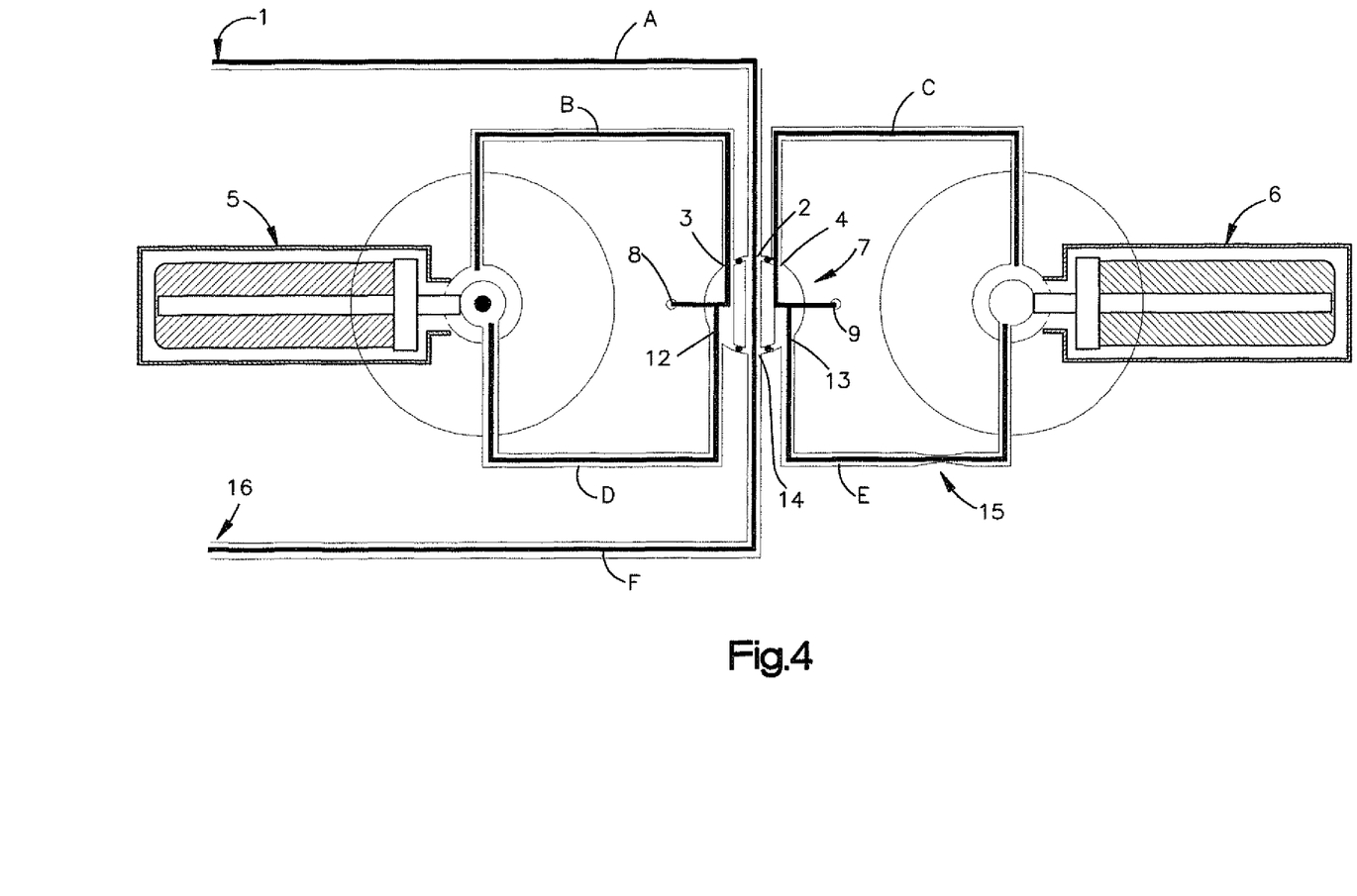
FIG. 4 is a schematic representation of the water treatment system shown in a bypass position in which inlet water is communicated directly to an outlet and the treatment cartridges are bypassed.

FIG. 1 schematically illustrates the overall water treatment system constructed in accordance with the invention. In the schematic representation of FIG. 1, water at an inlet port 1 is divided into two streams with each stream feeding an associated cartridge (5,6). Each water stream travels through the associated cartridge and is filtered thereby. The treated water exits the associated cartridge and is discharged by a single outlet port 16. FIG. 4 illustrates a bypass mode of the water treatment system. In this mode, water at the inlet port 1 is communicated directly to the outlet port 16. The treatment cartridge and the associated fluid paths are isolated from both the inlet 1 and the outlet 16.

Service Position—Flow (FIG. 1)

Water flows into the water treatment system through the inlet port (1). Using a balanced configuration, water is split into two streams, each processed by one cartridge (cartridge A and cartridge B.) (FIG. 3) This parallel flow allows for improved contact time, reduced pressure loss, and improved treatment compared to using one cartridge. Cartridges are replaceable, allowing the system to accommodate a variety of treatment options.

Figure 3:
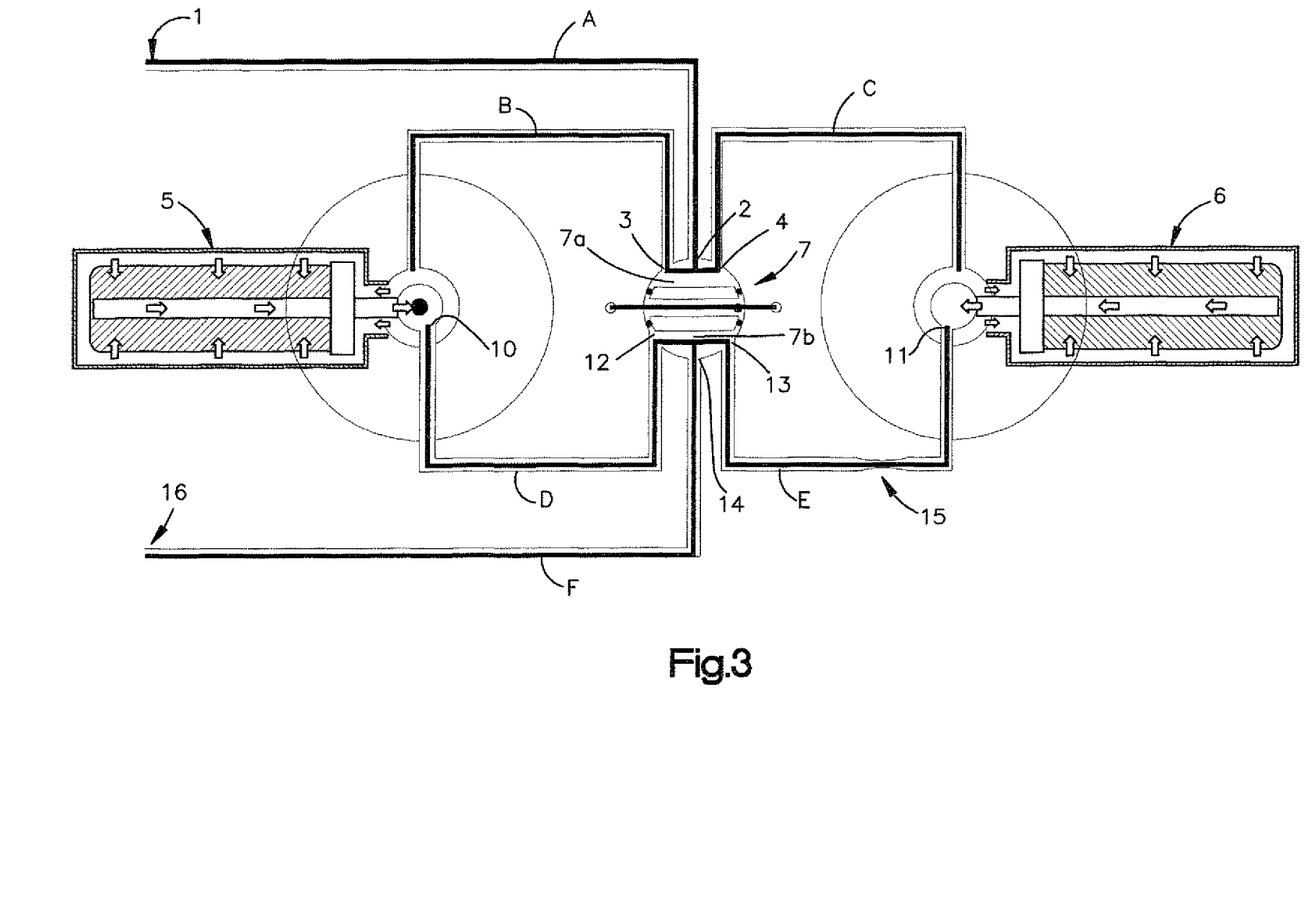
FIG. 3 is a schematic representation of the water treatment system with a bypass valve module shown in a service position at which water at an inlet is being treated by both cartridges prior to delivery to an outlet.

A flow manifold (17), indicated in FIG. 1, is designed to contain flow paths, water connections, by-pass valve, meter and vents for the water treatment system. The inlet port (1) is connected to the common inlet (2) via flow channel (A). The bypass valve (7) allows the system to be in service or by-pass. Inlet A (3), Inlet B (4) and the common inlet (2) form a common chamber 7a in the by-pass valve (7) when the by-pass valve (7) is in the service position (FIG. 3).

Figure 2:
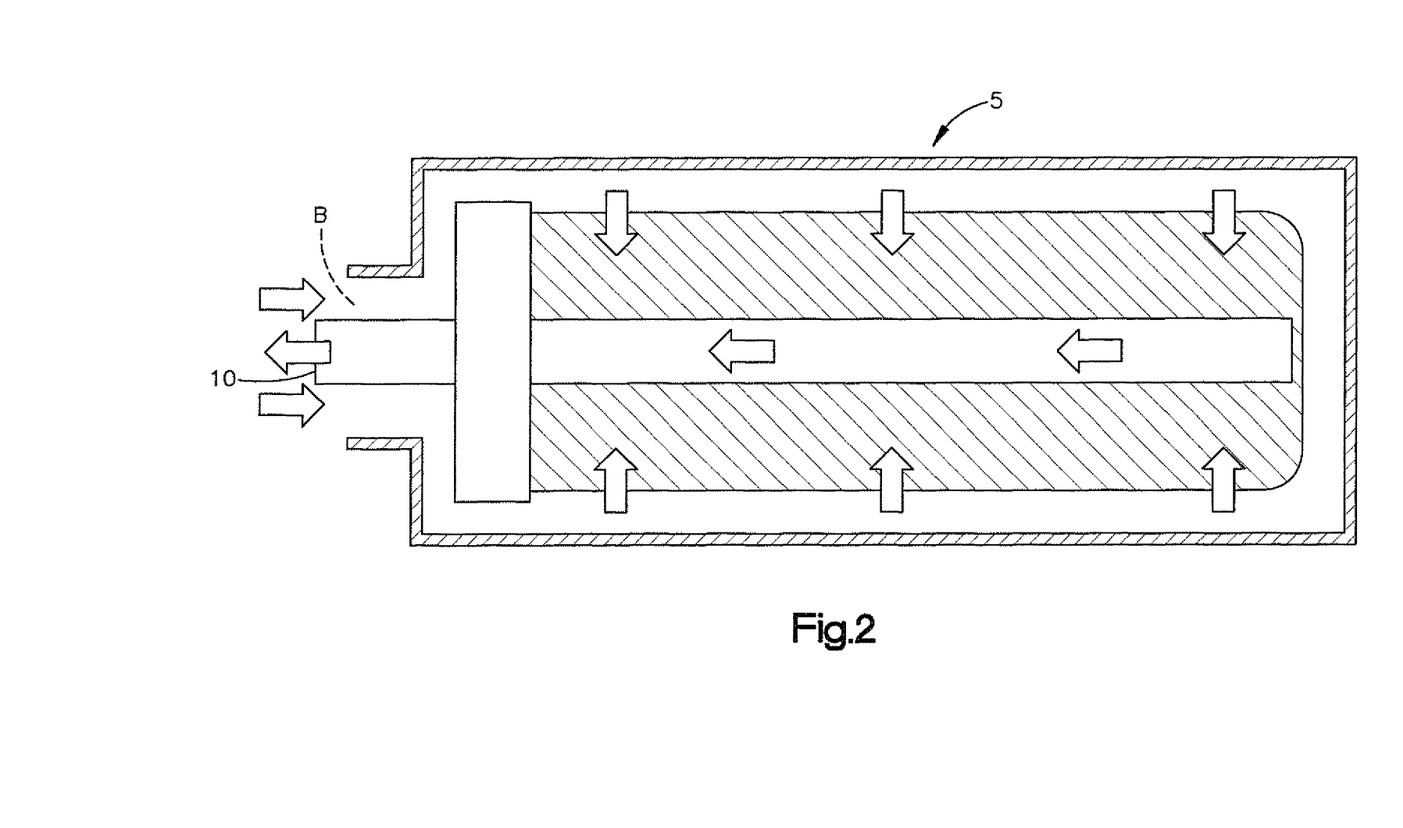
FIG. 2 is a sectional view of a cartridge constructed in accordance with an embodiment of the invention.

Water is then transported via a flow channel (B) and flow channel (C) to the cartridge inlet (5a) and cartridge inlet (6a). Cartridge inlets will connect to an external, replaceable cartridge, and will allow for flow from the outside chamber of the cartridge to the inside chamber (FIG. 2.) After being processed by the cartridge, water flows through the cartridge outlet (10) and the cartridge outlet (11). From the cartridge outlet (10), water is connected in the flow manifold (16) by flow channel (D). The flow channel (D) includes a water meter (18), shown only in FIG. 1, such as, but not limited to; a paddle, turbine or hall effect flow sensor. From the cartridge outlet (11), water is connected in the flow manifold (16) by flow channel (E). The flow channel (E) includes the flow balancer (15). The flow balancer is a device such as, but not limited to; a flow restrictor, capillary tube or orifice plate. The flow balancer (15) is needed to balance the flow restriction of flow channel (E) to the restriction of the water meter (18) located in the flow channel (D). Restrictions in the flow channel (D) and flow channel (E), must be equal to assure an equal volume of water is processed through the cartridges 5, 6.

Flow channels (D) and (E) are integral to the flow manifold (17) and connect to outlet A (12) and outlet B (13), respectively. The outlet A (12), the outlet B (13) and the common outlet (14) form a common chamber 7b in the bypass valve (7) when the bypass valve (7) is in the service position. The common outlet (14) connects to flow channel (F), which is then connected to outlet port (16).

Bypass Position—Flow (FIG. 4)

Water flows into the water treatment system through the inlet port (1). The inlet port (I) is connected to the common inlet (2) via the flow channel (A). The bypass valve (7) allows the system to be in service or by-pass. In the bypass position, the bypass valve (7) connects the common inlet (2) to the common outlet (14). The common outlet (14) is connected via flow channel (F) to the outlet port (16). While in the bypass position, inlet A (3), vent A (8) and outlet A (12) are connected and inlet B (4), vent B (9) and outlet A (13) are connected These connections allow the cartridges to vent any trapped pressure before either are removed.

Figure 5:
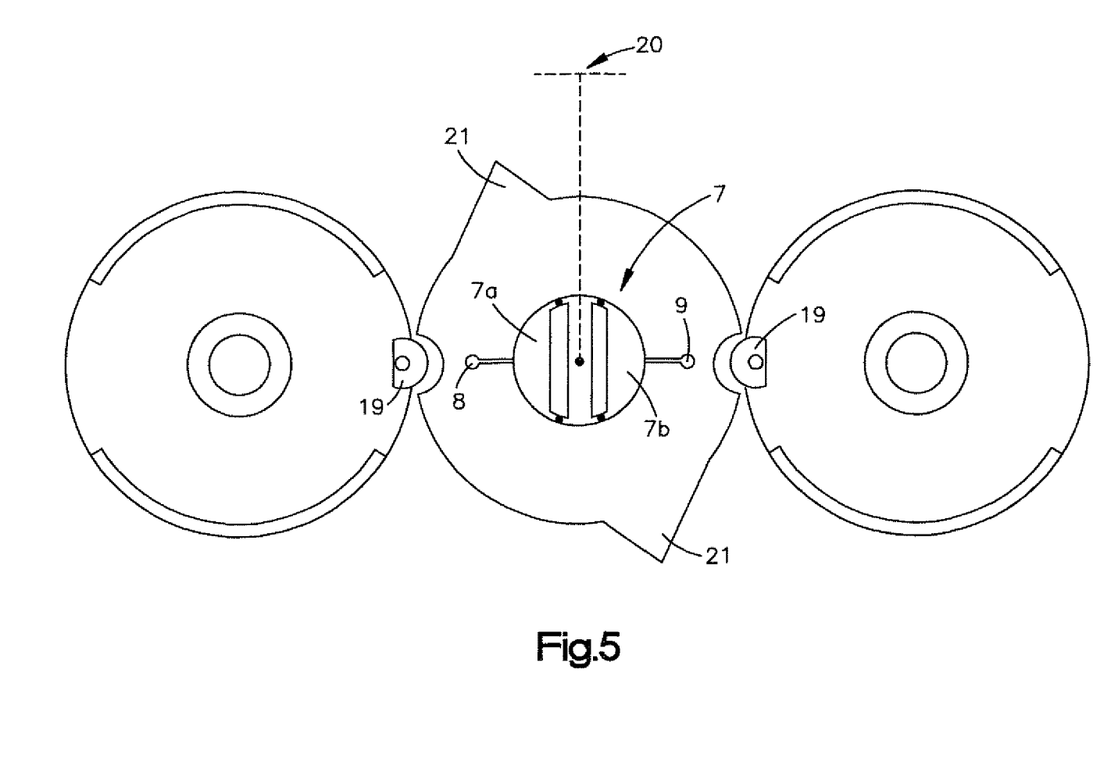
FIG. 5 schematically represents the bypass module in a locked bypass position with cartridges removed.

Bypass Position—Locking Handle Locked (FIG. 5)

Figure 6:
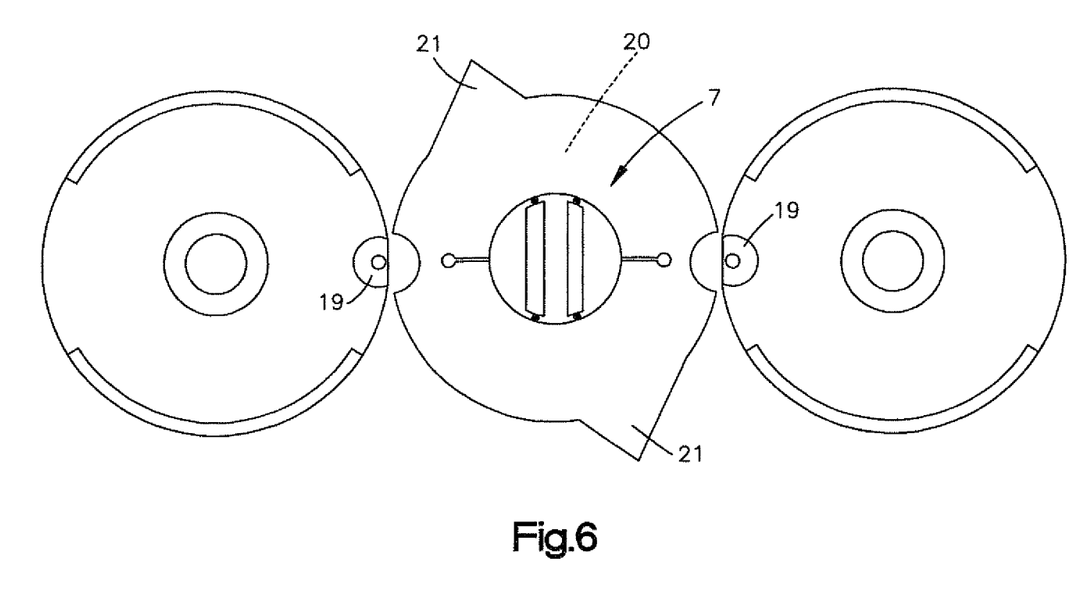
FIG. 6 schematically represents the bypass module in an unlocked condition but shown in the bypass position with cartridges installed.

The bypass valve is attached to an external locking handle 20, (shown schematically in FIG. 5) which moves directly with the movement of the bypass valve 7. While in the bypass position, a cartridge can be inserted or removed from the flow manifold 17. Locking cams (19), provide an interference lock to the locking handle. When a cartridge is inserted, the locking cam (19) is rotated out of its locking position. The bypass valve (7) cannot be turned unless both locking cams (19) are rotated by the insertion of two cartridges. (FIG. 6) The bypass valve (7) and locking handle (20) are designed so they can either be rotated by a mechanical or hydraulic force. In the preferred embodiment, as a cartridge is inserted in position on the manifold, it engages and moves or rotates a member connected to an associated locking cam 19 and moves or rotates it from the position shown in FIG. 5 to the position shown in FIG. 6.

Figure 7:
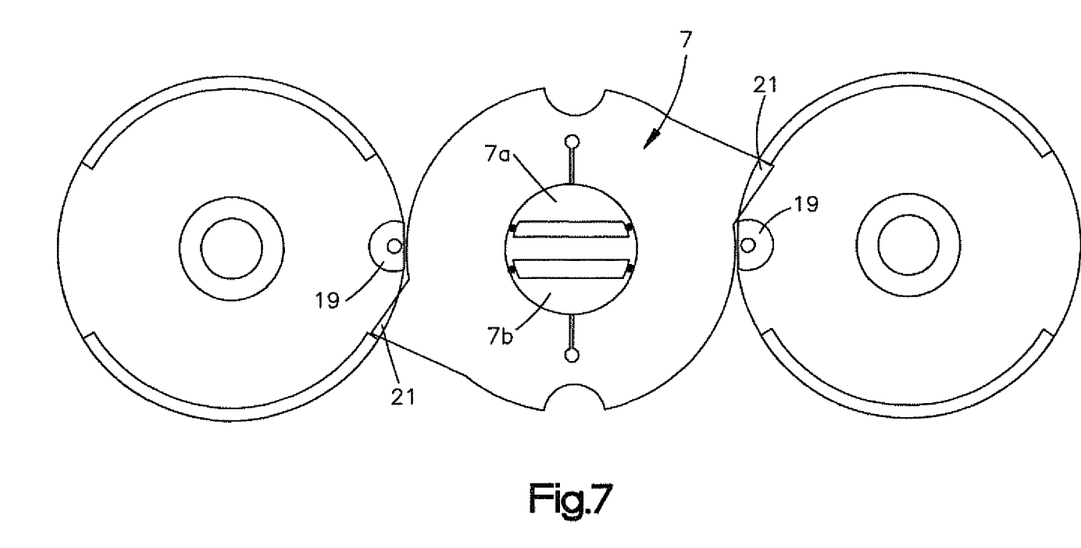
FIG. 7 schematically illustrates the service position of the bypass module at which the removal of the cartridges is inhibited.

Service Position—Cartridge Locked (FIG. 7)

When the bypass valve (7) is turned to the service position, locking blocks (21) are moved or are rotated into position, which inhibits the removal of an installed cartridge. This mechanism provides a safety to prevent a cartridge from being removed while the system is in the service position.

Cartridge Insertion and Locking

The design of the flow manifold (17), locking handle (20), bypass valve (7) and cartridges 5, 6, provide an interlock which allows either cartridge to be removed only if the unit is in the bypass position. The bypass cannot be moved to the service position unless both cartridges are in inserted into the flow manifold (17). This interlock can be achieved through means such as, but not limited to a mechanical lock or a hydraulic lock.

When inserting the cartridge, it is held in place by a slot and tab arrangement which can be engaged either through a mechanical or hydraulic force.

In the preferred and illustrated embodiment, water flow through the cartridges 5, 6 is metered in order to monitor the amount of water treated by a given cartridge. In the illustrated embodiment, the monitoring mechanism which preferably forms part of the manifold 17 is similar to or functions substantially like the metering mechanisms described in U.S. Pat. Nos. 6,428,708 and/or 4,698,164, both of which are incorporated by reference. As disclosed in these patents, water flowing through a cartridge is monitored by a flow metering arrangement that includes a turbine that is rotated by water traveling through the cartridge. The turbine is operatively coupled, through a gear train, to a stem assembly that rotates in response to rotation of the turbine. The stem assembly includes an end that may provide an indication of the exhaustion level of the cartridge depending on its position within an associated chamber. When a cartridge is installed into the manifold, the stem assembly operatively engages a threaded keeper or hold-off pin, which forms part of the cartridge. As the stem assembly is rotated in response to rotations of the turbine, it rotates the threaded pin which causes the pin to move in an axial direction and thus moves the stem assembly within its associated receiving chamber. The extent of movement of the threaded keeper or hold-off pin is consequently related to the amount of water treated by a cartridge.

Figure 8:
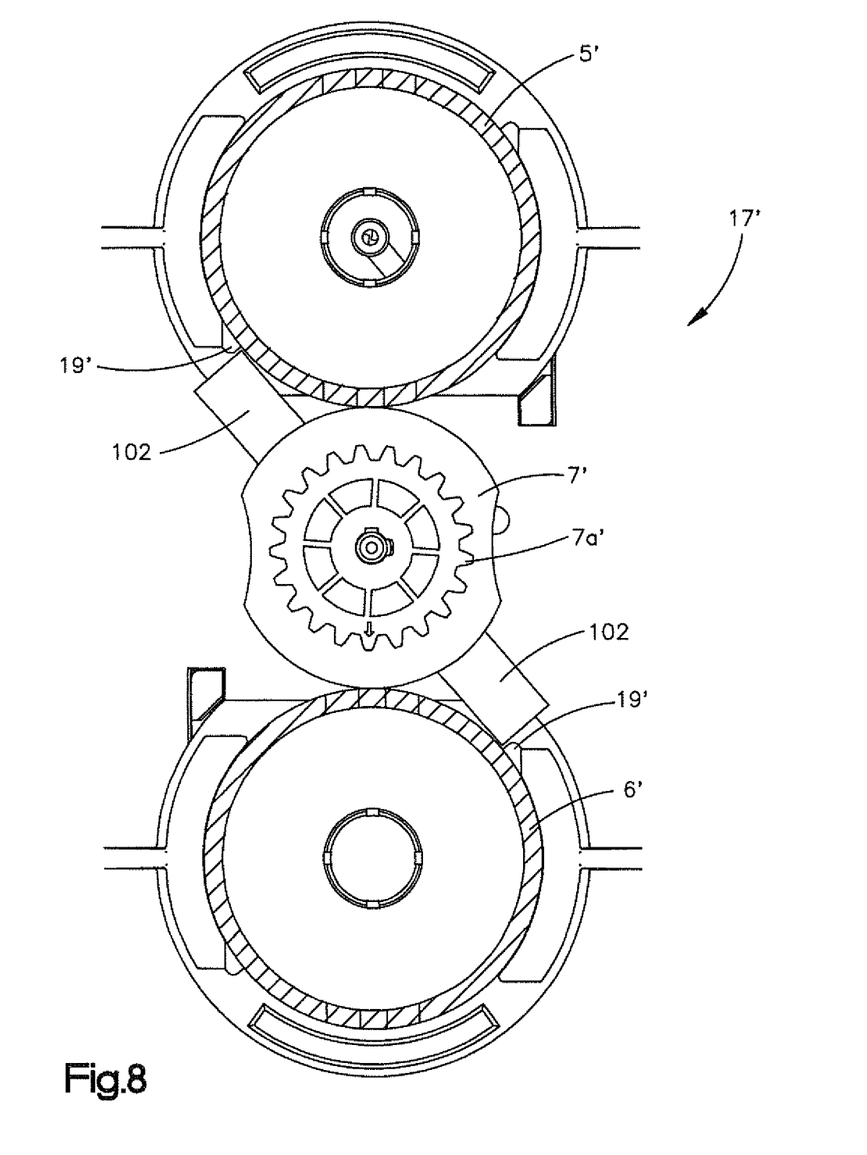
FIG. 8 is a plan view, partially in section, of an alternate embodiment of the invention, shown with water treatment cartridges installed and in a service position.

FIGS. 8-10B, illustrates another embodiment of the invention. For purposes of explanation, components in this alternate embodiment that correspond to components shown in FIGS. 5-7 will be designated by like reference characters, followed by an apostrophe. Referring to FIG. 8, an alternate manifold (17') 7' is shown, to which portions of cartridges 5', 6' are shown attached. In the arrangement shown in FIG. 8, the cartridges 5', 6' have been rotated to their operative positions and the water treatment system is in service, i.e., water is flowing from a source, through both cartridges and to a common outlet (not shown). A bypass valve constructed in accordance with the alternate embodiment, is shown in its in-service position. In this position, the common inlet 2 (shown in FIG. 1) is communicated to both cartridges 5', 6' and the outlets of these cartridges are communicated to the common outlet 14 (shown in FIG. 1). In this position, rotation of the cartridges in a removing direction is inhibited by the abutting contact between abutment stems 102 forming part of the bypass valve 7' and wings 19' which form part of the cartridges 5', 6'. Specifically, and as seen best in FIG. 8, the cartridges cannot be rotated in the counterclockwise releasing direction (as viewed in FIG. 8) by virtue of the contact between the abutment stems 102 and the wings 19'.

It should be noted here, that in the alternate embodiment, the bypass valve 7' includes a gear 7a'. A smaller gear forming part of an operating handle (not shown) is engageable with the gear 7a' such that when the handle is rotated, the bypass valve is concurrently rotated, provided that its movement is not blocked by the wings 19' or other components to be described. This arrangement provides a torque increasing gear reduction.

Figure 9A:
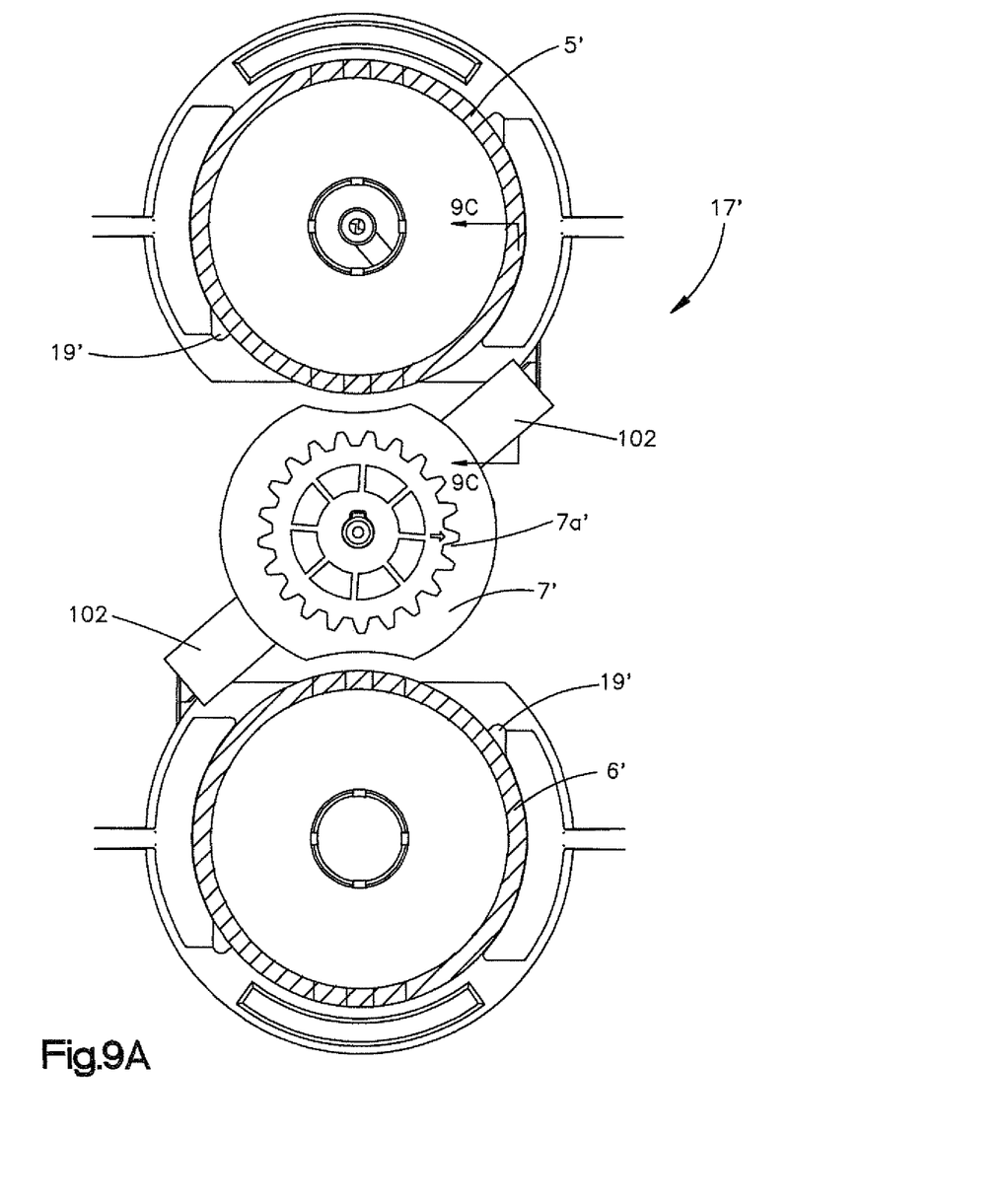
FIG. 9A is another plan view (partially in section) of the alternate embodiment shown in a bypass mode.
Figure 9B:
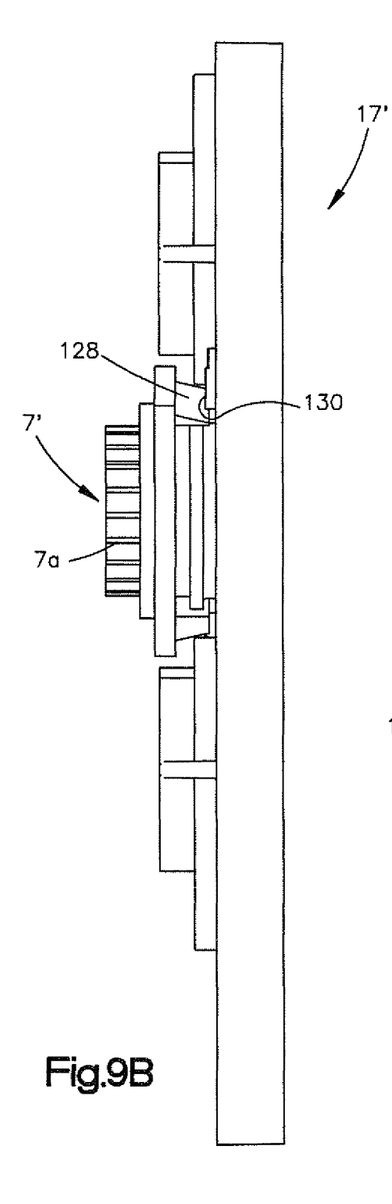
FIG. 9B is a side elevational view of the apparatus shown in FIG. 9A with cartridges removed.
Figure 9C:
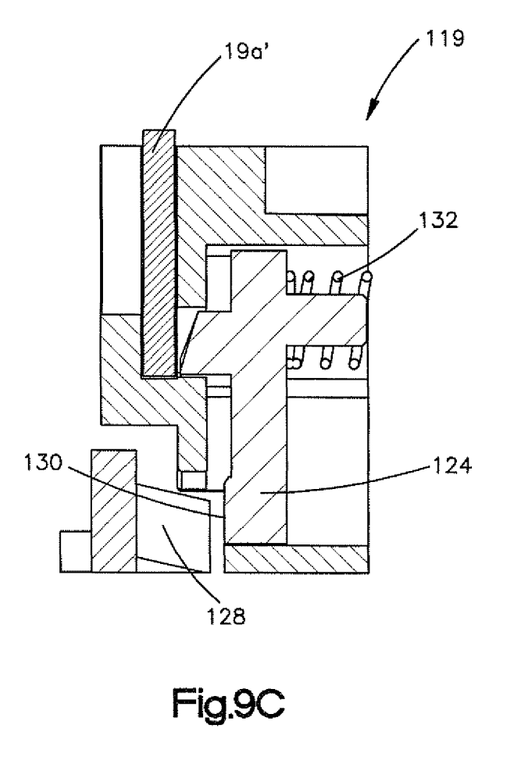
FIG. 9C is a sectional view as seen from a plane indicated by the line 9C-9C in FIG. 9A.

FIGS. 9A-9C illustrates the bypass valve 7' rotated to its bypass position in which, as explained earlier, the common inlet 2 (shown in FIG. 1) is communicated directly with the common outlet 14 and the cartridges are bypassed, thus allowing the cartridges 5', 6' to be removed and replaced. According to this embodiment, an interlock mechanism, indicated generally by the reference character 119 in FIG. 9C, permits the bypass valve 7' to be rotated to the position shown in FIG. 9A, only when both cartridges 5', 6' are installed and in their operative positions. Referring, in particular, to FIG. 9C, a tab 19a' is provided on each cartridge and may form part of the wings 19'. When a cartridge is rotated to its operative position, the tab 19a moves to the position shown in FIG. 9C at which it depresses or moves a spring-biased interlock element 124. The element 124 appears tomahawk-shaped in cross-section. When the element 124 is moved to the position shown in FIG. 9C, a clearance is established between an abutting wall 128 forming part of the valve 7' and a stop 130 forming part of the interlock element 124. As seen best in FIG. 9C, when the interlocking element 124 is depressed, it allows the abutting wall 128 to move past the stop 130 when the bypass valve 7' is rotated. Thus, when the cartridges are present and in their operating positions, the bypass valve 7' can be rotated from the position shown in FIG. 8 to the position shown in FIG. 9A. In this position and as seen best in FIG. 9A, the abutment stems 120 disengage the cartridge wings 19' and allow the cartridges to be rotated in order to release them from the manifold 17'.

Figures 10A, 10B:
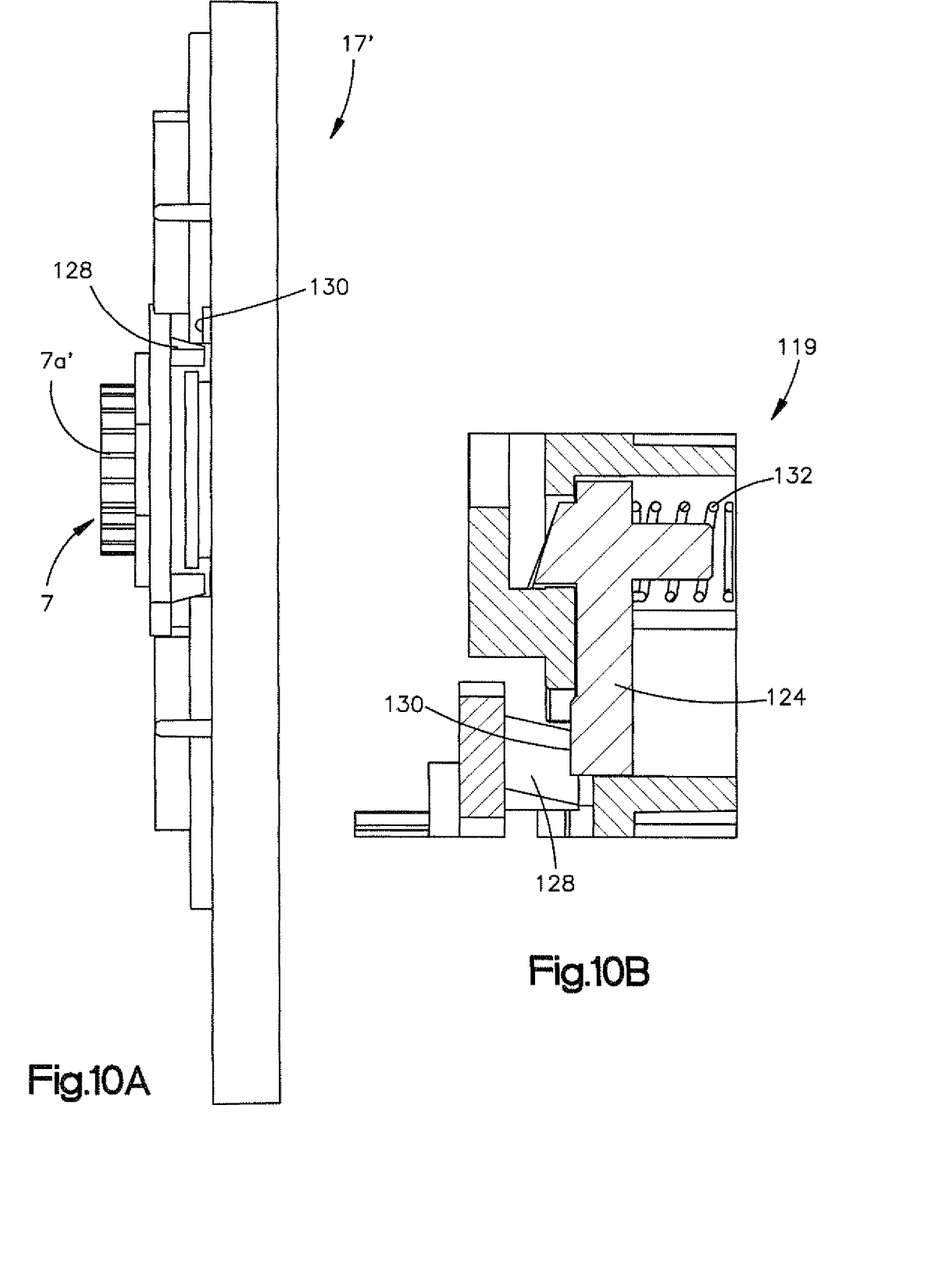
FIG. 10A is a side elevational view of the apparatus shown in FIG. 9A with cartridges removed.
FIG. 10B is another sectional view similar to the section view shown in 9C showing an interlock element in a blocking position.

Referring in particular to FIG. 10b, when the cartridges are removed, the cartridge tabs 19a' disengage the associated interlock element 124, allowing its associated biasing spring 132 to move it towards the left (as viewed in FIG. 9C). In this position, the stop 130 engages the abutting wall 128 of the bypass valve 7'. This inhibits rotation of the bypass valve 7', thus maintaining its bypass position shown in FIG. 9A. The bypass valve 7' can only be rotated to the service position, i.e., the position shown in FIG. 8, when both cartridges 5', 6' are installed and rotated to their service positions so that the cartridge tabs 19a' move the interlock elements 124 to the position shown in FIG. 9C. In this position of the element 124, the associated stop 130 is out of contact with the associated abutment wall 128 forming part of the bypass valve 7'.

Figure 11:
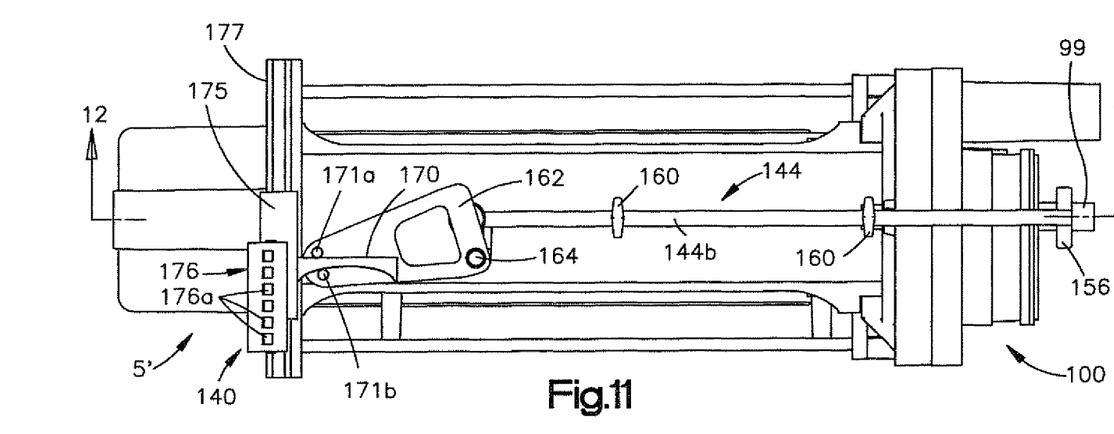
FIG. 11 is a fragmentary, elevational view of a cartridge mounted to a manifold constructed in accordance with a preferred embodiment of the invention; and, FIG. 12 is a sectional view as seen from the plane 12-12 in FIG. 11.
Figure 12:
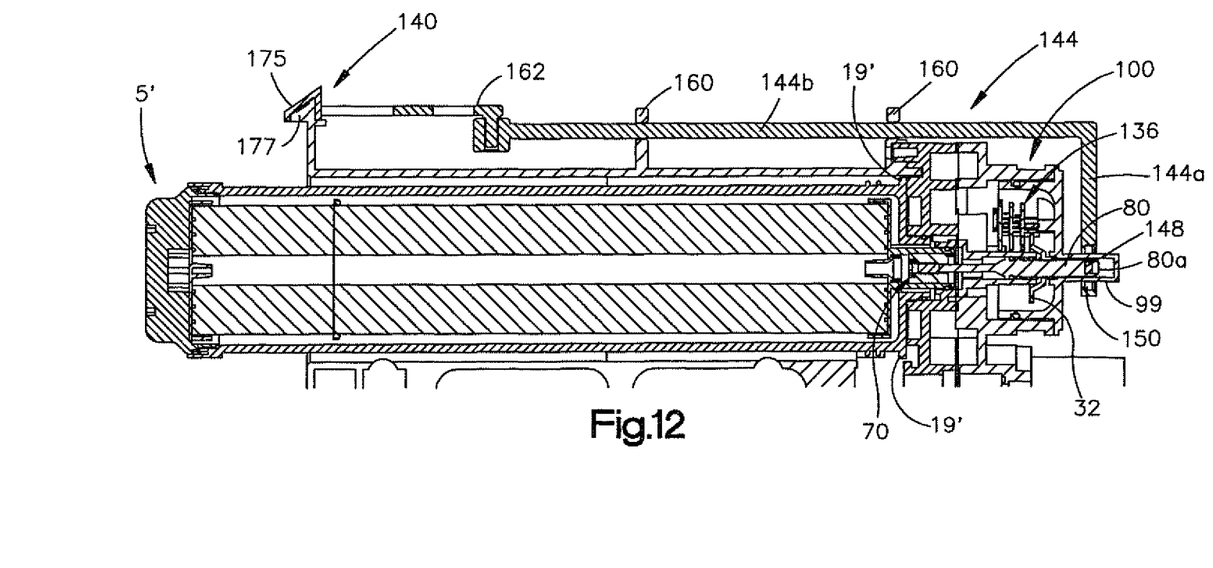

FIGS. 11 and 12 illustrate a cartridge life or usage indicator constructed in accordance with a preferred embodiment of the invention. As seen best in FIG. 12, the disclosed manifold 17' includes a flow monitoring mechanism indicated generally by the reference character 100 for each cartridge 5', 6'. The flow monitoring mechanism 100 is substantially similar to the fluid monitoring mechanism disclosed in U.S. Pat. No. 6,428,708, which is hereby incorporated by reference. As disclosed in that patent, the mechanism includes an elongated stem assembly 80 having a life indicating end 80a. The position of the end 80a within an associated, preferably transparent, chamber 99 provides an indication of how much fluid has been treated by the cartridge. As more fully disclosed in U.S. Pat. No. 6,428,708, the movement of the associated stem 80 within the chamber 99 is caused by the threaded engagement between a driver disk 32 which is coupled to the stem 80. The driver disk, in turn, is rotated in response to the rotation of a water usage turbine (not shown) which is coupled to the drive disk by a gear train 136. The turbine is rotated by the flow of water as it travels through the cartridge.

As more fully explained in U.S. Pat. No. 6,428,708, each cartridge, i.e., cartridge 5' includes a keeper or hold-off pin 70. When a cartridge is installed into the manifold 17', the hold-off pin or element 70 abuttingly engages the left end of the stem 80 and moves it towards the right as viewed in FIG. 12. The keeper element 70 and the left end of the stem 80 include structure which rotatably couples the stem 80 to the hold-off element 70. The stem 80 is rotatably driven by the turbine (via the gear train 136 and driver disk 32), in response to water flow through the cartridge. The hold-off keeper 70 is concurrently rotated by the left end of the stem 80 and is caused to move leftwardly, as viewed in FIG. 12. As it moves leftwardly, the stem 80 also moves leftwardly, thus providing an indication of the quantity of the fluid treated by an associated cartridge. In one embodiment, the keeper element 70 eventually is fully unthreaded from its retainer and is released into the cartridge, allowing the stein 80 to move to a "cartridge depleted" position. For some applications, a valve element may be provided in order to block flow through the cartridge when the stem 80 moves to the "cartridge depleted" position. For other embodiments, the stem 80 moves to a far left position to indicate that the cartridge is fully exhausted.

According to the invention, movement of the life indicating stein assembly 80 is transmitted to a remotely located operator visible display indicated generally by the reference character 140 via linkage indicated generally by the reference character 144. The linkage 144 comprises a vertical segment 144a joined to a transverse segment 144b. According to the invention, movement of the life indicating stem 80 is magnetically coupled to the linkage 144. In particular, a magnet 148 is mounted near the end of the stein 80 and in alignment with a ring-shaped magnet assembly 150 forming part of the linkage 144. The magnetic attraction between the stem magnet 148 and the linkage magnet 150 causes movement in the stem 80 to be transmitted to the linkage without requiring a direct mechanical coupling. Accordingly, as the stem 80 moves axially (as viewed in FIG. 12) within the chamber 99, it produces attendant motion in the linkage 144. Referring also to FIG. 11, a lower end of a linkage segment 144a terminates in an annular element 156, which mounts the ring-shaped magnet 150. The annular element 156 slidably engages the life chamber housing 99 and slides along the housing in unison with the life indicating stem 80.

The transverse link segment 144b is slidably held by stand-offs 160. As seen best in FIG. 11, the left end of the transverse link segment 144b is pivotally connected to a crank 162 that is pivotally mounted to the manifold 17' by a pivot 164. As should be apparent, transverse movement in the link segment 144b (in response to movement in the life indicating stem 80) produces pivoting movement in the crank 162. The left end of the crank 162 (as viewed in FIG. 11), slidably engages an eyebrow-shaped indicator segment 170 between two (2) confronting pins 171a, 171b. The eyebrow-shaped segment 170 is attached to a life indicator 175, which is slidably movable on a rail in response to pivotal movement in the crank. A display element 176, including a plurality of windows 176a, is positioned above the slidable life indicator 175. The life indicator moves below the windows to change the color of a given window to indicate the quantity of fluid that has been treated by the cartridge. As the indicator moves below a given window, its color changes. For example, if the crank driven indicator 175 is given a black color, the windows immediately above the indicator will appear black. When the indicator is moved to a position in which all windows are blocked, i.e., black, exhaustion of the cartridge is indicated to the user.

The present invention provides a compact and efficient water treatment system. By using two cartridges arranged in parallel, the pressure drop across the water treated system is reduced. As indicated above, the cartridges may contain the same treatment material or different treatment materials. The cartridges may function as filters or may be used to add desirable chemicals or compounds to the water stream and combinations of these cartridges may be installed in the unit.

In the preferred arrangement, the cartridges are arranged horizontally in the unit, i.e., as shown in FIGS. 11 and 12.

In this preferred arrangement, efficient space utilization is realized and, as indicated above, can result in a relatively small unit that can be mounted under a sink. The cartridges are also easily removed and replaced.

Although the invention has been described with a certain degree of particularity, it should be understood that those skilled in the art can make various changes to it without departing from the spirit or scope of the invention, as hereinafter claimed.

Having described the invention, we claim:

1. A water treatment system, having a service mode and a bypass mode, comprising:
  a) an inlet for receiving water to be treated;
  b) structure defining a pair of fluid streams concurrently communicating with said inlet, each fluid stream concurrently receiving water to be treated from said inlet under predetermined operating conditions;
  c) a pair of treatment cartridges for concurrently treating water in said fluid streams, one of said treatment cartridges associated with one of said fluid streams, the other of said treatment cartridges associated with said other fluid stream, said treatment cartridges being replaceable;
  d) a valve module for concurrently communicating each fluid stream with an associated replaceable treatment cartridge and further comprising structure defining associated outlet passages for communicating discharge outlets of each treatment cartridge with a common outlet;
  e) said treatment cartridges rotationally coupled to said valve module, each replaceable treatment cartridges sealingly engaging said valve module upon rotation of said treatment cartridge from a released position to a filtering position, said replaceable treatment cartridge disengageable from said valve module only when said treatment cartridge is rotated to its released position;
  f) said valve module including a valve member movable between a service position and a bypass position such that when in said service position, said valve member concurrently communicates each fluid stream with its associated replaceable treatment cartridge and when in said bypass position, said valve member communicates said inlet directly with said common outlet and bypasses both of said replaceable treatment cartridges;
  g) camming elements, responsive to insertion and engagement of said rotatably coupled replaceable treatment cartridges, which inhibit movement of said valve member from said bypass position to said service position if both of said replaceable treatment cartridges are not installed on said valve module or are not properly engaging said valve module;
  h) said valve member including blocking structure for inhibiting rotation of each of said replaceable treatment cartridges in order to prevent removal of said treatment cartridges when said valve member is in said service position, said blocking structure operatively coupled to said valve member such that when said valve member is in the service position, said blocking structure is moved to a blocking position at which rotation of said treatment cartridges is inhibited and when said valve member is in the bypass position, said blocking structure is moved to a release position at which rotation of said treatment cartridges is permitted in order to release said treatment cartridges from said valve module; and
  i) a vent controlled by said valve member such that when said valve member is in the bypass position said vent is opened in order to release any trapped pressure in the treatment cartridges, said vent comprising at least one vent port located within said valve module for discharging said pressure while said treatment cartridges are still rotatably coupled to said valve module and prior to removal rotation of the replaceable treatment cartridge;
  j) whereby movement of said valve member from said service position to said bypass position causes the simultaneous completion of three functions, namely, the communication of said inlet with said common outlet, the movement of said blocking structure to its release position in order to allow rotation and subsequent removal of one or both replaceable treatment cartridges and the release of any trapped pressure in the treatment cartridges prior to the rotation of one or both of said treatment cartridges from their filtering positions to their released positions.

2. The apparatus of claim 1 wherein at least one of said outlet passages includes a water flow sensor.

3. The apparatus of claim 2 wherein another of said outlet passages includes at least one restrictor for balancing flows in said outlet passages.

4. The apparatus of claim 1 further comprising a manifold to which said replaceable treatment cartridges are releasably engaged.

5. The apparatus of claim 4 wherein said structure defining said fluid streams and said outlet passages form part of said manifold.

6. The apparatus of claim 1 further comprising a flow metering mechanism associated with each treatment cartridge, said flow metering mechanism comprising:
  a) an indicator member movable within an indicator chamber, the position of said member within said chamber being indicative of the amount of water treated by an associated treatment cartridge;
  b) a first magnet held by said indicator member;
  c) a second magnet forming part of a linkage external to said chamber, said second magnet arranged such that it is magnetically coupled to said first magnet such that movement in said indicator produces concurrent movement in said second magnet;
  d) a linkage connected to said second magnet and operative to move a cartridge depletion indicator member visible by the operator, but remote from said indicator member.

7. The apparatus of claim 6 wherein said linkage includes a crank pivotally connected to a link member such that axial movement of said link member produces rotative movement in said crank, said crank operatively connected to a remote depletion indicator, said crank operative to move said remote depletion indicator relative to an associated display member for indicating the degree of depletion of an associated treatment cartridge in response to movement in said indicator member.

8. The apparatus of claim 6 wherein said second magnet forms part of a ring member which is slidably received by said indicator chamber and moves along said indicator chamber in response to movement in said indicator member.

9. The apparatus of claim 4 wherein at least one of said treatment cartridges is operative to remove contaminants from water delivered to said inlet.

10. The apparatus of claim 4 wherein at least one of said treatment cartridges is operative to add a beneficial compound to the water received at said inlet.

11. The apparatus of claim 4 wherein the one of said treatment cartridges removes contaminants from water delivered to said inlet and the other of said treatment cartridges adds a beneficial compound to water delivered to said inlet.

12. The water treatment system of claim 1, wherein said valve module concurrently communicates each fluid stream with said vent when said valve member is in said bypass position.

13. The water treatment system of claim 1, wherein said valve module concurrently communicates each outlet passage with a vent when said valve member is in said bypass position.

14. The water treatment system of claim 1, wherein said vent comprises two vent ports located in said valve module.

* * * * *